United States Patent

McMillin et al.

[11] 4,300,123
[45] Nov. 10, 1981

[54] OPTICAL READING SYSTEM

[75] Inventors: John V. McMillin; Dale W. Schroeder, both of Iowa City, Iowa

[73] Assignee: Westinghouse Electric Corp., Pittsburgh, Pa.

[21] Appl. No.: 457

[22] Filed: Jan. 2, 1979

[51] Int. Cl.³ .............................................. G06K 7/14
[52] U.S. Cl. ........................... 340/146.3 Z; 235/436; 235/456
[58] Field of Search ............... 235/436, 438, 440, 456, 235/474, 495; 340/146.3 A, 146.3 H, 146.3 Q, 146.3 Z, 146.3 AG, 146.3 AH, 146.3 MA; 35/48 B; 250/555, 566, 568, 569

[56] References Cited

U.S. PATENT DOCUMENTS

| | | | |
|---|---|---|---|
| 3,553,646 | 1/1971 | Hardin et al. | 340/146.3 AH |
| 3,573,730 | 4/1971 | Andrews et al. | 340/146.3 Q |
| 3,579,249 | 5/1971 | Dewey et al. | 235/92 PC |
| 3,618,018 | 11/1971 | Johnston et al. | 340/146.3 AH |
| 3,800,439 | 4/1974 | Sokolski et al. | 35/48 B |
| 3,868,635 | 2/1975 | Shah et al. | 340/146.3 MA |
| 3,969,699 | 7/1976 | McGlaughlin | 340/146.3 MA |
| 4,021,777 | 5/1977 | Shepard | 340/146.3 AH |
| 4,148,062 | 4/1979 | Kamin | 340/146.3 Q |
| 4,153,895 | 5/1979 | Weisbrod et al. | 340/146.3 AG |

*Primary Examiner*—Leo H. Boudreau
*Attorney, Agent, or Firm*—M. P. Lynch

[57] ABSTRACT

A line scanning camera generates signal information indicative of marks on a scanned document and a selectable memory containing several document formats cause the signal information from the scanned document corresponding to the selected format to be transmitted for evaluation.

12 Claims, 9 Drawing Figures

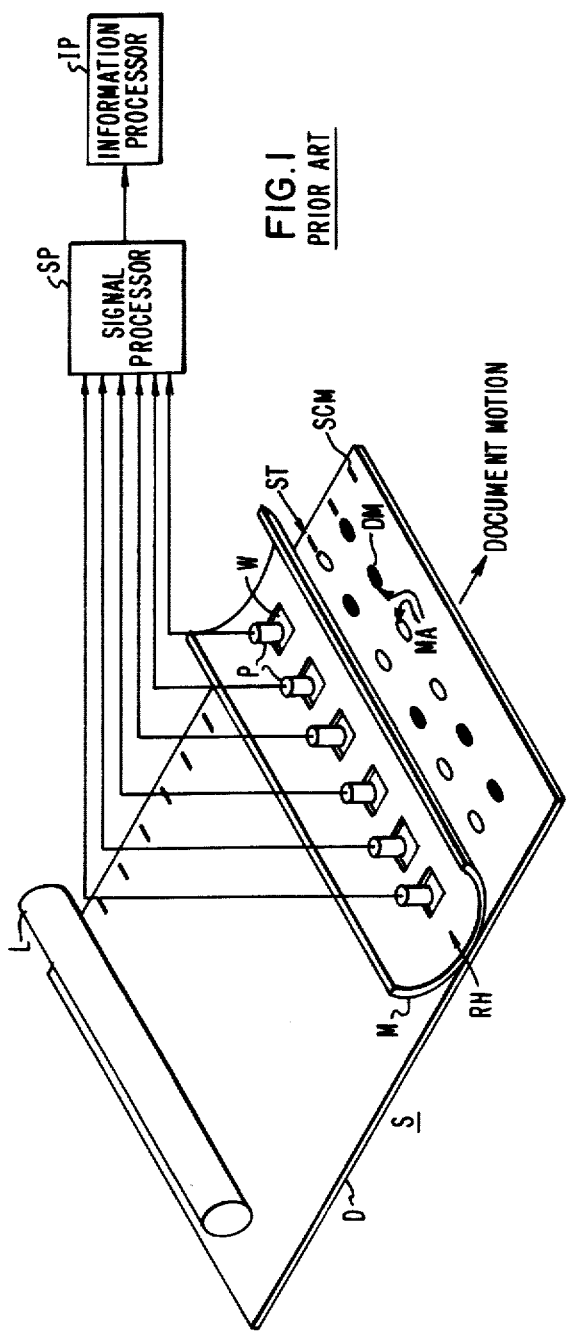
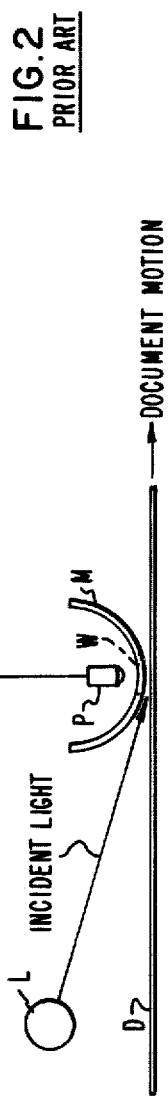
FIG. 1 PRIOR ART
FIG. 2 PRIOR ART

OPTICAL READING SYSTEM

BACKGROUND OF THE INVENTION

In conventional optical reading systems employed to extract information from characters or marks appearing on a document, such as, a student test answer sheet, a reading head is employed which consists of a mechanical mask having a plurality of apertures or windows and an array of phototransistors aligned with the mask apertures to generate information as to the presence or absence of a mark on an area of the document corresponding to a mask aperture. Each document vendor employs a unique format, or pattern of mark areas on the document, thus each document format requires a different reading head having a mechanical mask with an aperture pattern consistent with the mark area pattern of the particular document. Typically, the apertures of a mechanical mask form a linear array with a corresponding linear array of phototransistors aligned with the apertures. A document to be read is moved beneath the reading head such that the linear array of phototransistors extracts line by line information from the moving document. In the application of such an optical reading system to a test answer sheet on which a student has entered an answer selection by filling in a designated mark area with a graphite pencil, the phototransistors would transmit a signal on the basis of the light reflected from the portion of the scan document defined by the corresponding mask aperture. The mechanical aperture mask of the conventional reading head of an optical reading system limits the use of the optical reading system to extracting information from a document format corresponding to the mechanically fixed pattern of apertures in the associated mechanical mask. This approach to defining the format sensitivity of an optical reading system significantly limits the flexibility of an optical reading system for extracting information from a variety of document formats.

SUMMARY OF THE INVENTION

In the optical reading system disclosed herein with reference to the accompanying drawings, the conventional mechanical mask apertures and associated array of phototransistors are eliminated. These components are replaced by a commercially available line scanning camera having an array of photosensitive elements, i.e. charge-coupled devices, forming a linear detector, and a storage memory having a plurality of selectable stored document formats which function to "mask" the information extracted from a document by the line scanning camera in accordance with a selected stored document format.

The black/white signature of a scan line, or sweep, of the line scanning camera across a document produces an analog "video" output signal from the camera. This signal is connected to a digital converter which converts the analog signal into a multiplicity of digital levels, or thresholds, indicative of the white/gray/black levels of discrete portions or "pixels" (picture elements) of each document line scan, corresponding to each photosensitive element in the camera. This multilevel mark density discrimination permits electronic differentiation between a smudge, an inadvertent pencil mark, an erased answer, and a legitimate mark or character appearing on the document.

The "masking" of each scanned line of a moving document in accordance with a specific document format is controlled by the selected stored program of a memory device such as a host computer or a series of programmable read-only-memories (PROM's). The selection of a particular stored document format to achieve the desired "masking" can be implemented by a simple mechanical selector switch, or can be controlled by a host computer which may also be used to evaluate the information appearing on the document corresponding to the selected document format.

Thus, the conventional mechanical aperture mask is replaced by a selectable memory device which controls the inherently high resolution output capability of a line scanning camera. While the selectable document format masks can be programmed into a host computer, the availability and state of the art of inexpensive programmable read-only-memories (PROMs) permits the use of such devices as the document format masking control means. Thus, the basic scanning system employing the line scanning camera can be adapted to read any given document format merely by introducing a different programmable read-only-memory having a stored pattern corresponding to the particular document format to be read. The memory means containing the stored document formats operates in conjunction with a data totalizer to totalize data from the line scanning camera corresponding to the pixels within the designated mark areas of the document format to be read. Thus, a single optical reading system, including a plurality of selectably activated stored document formats, each representing a document format of a particular document, has the desired flexibility to be instantaneously adaptable for reading any given document format. A consequent advantage is that documents of widely varying formats can be scanned on an intermixed basis within a stack of documents to be fed into the optical reading system. This flexibility and capability is not available in the conventional optical reading systems.

The line scanning camera, together with associated optics and light source, and in combination with selectable, stored document-format control and related processing logic, as described herein, achieves higher resolution, more flexible document reading than has heretofore been possible.

BRIEF DESCRIPTION OF THE DRAWINGS

The invention will become readily apparant from the following exemplary description in connection with the accompanying drawings:

FIGS. 1 and 2 are Prior Art illustrations of the conventional mechanical aperture mask reading head employed in prior art optical reading systems;

DESCRIPTION OF THE PREFERRED EMBODIMENT

Referring to FIGS. 1 and 2 there is pictorially illustrated a Prior Art embodiment of an optical reading system S consisting of a reading head RH which views on a line by line basis the information on a moving document D illuminated by a light source L. The document D exhibits a document format having a vertical scan track ST of timing marks, or scan marks, SCM and a pattern of mark areas MA, as in a test scoring answer sheet, suitable for accepting a data mark DM typically produced by filling in a mark area MA with a graphite pencil. The reading head RH consists of a mechanical mask M having a linear array of apertures or windows W and a photodetecting device P associated with each window W. The photodetecting device P transmits an electrical signal indicative of the light reflected from that portion of the document exposed by the corresponding window W to a signal processing circuit SP which functions to identify the presence or absence of a data mark DM in the mark areas MA viewed by the respective photodetectors P. A photodetector P associated with a window aligned with the scan track ST permits identification of the line or row of mark areas being viewed by the reading head RH at any given instant of time.

Figure 3:
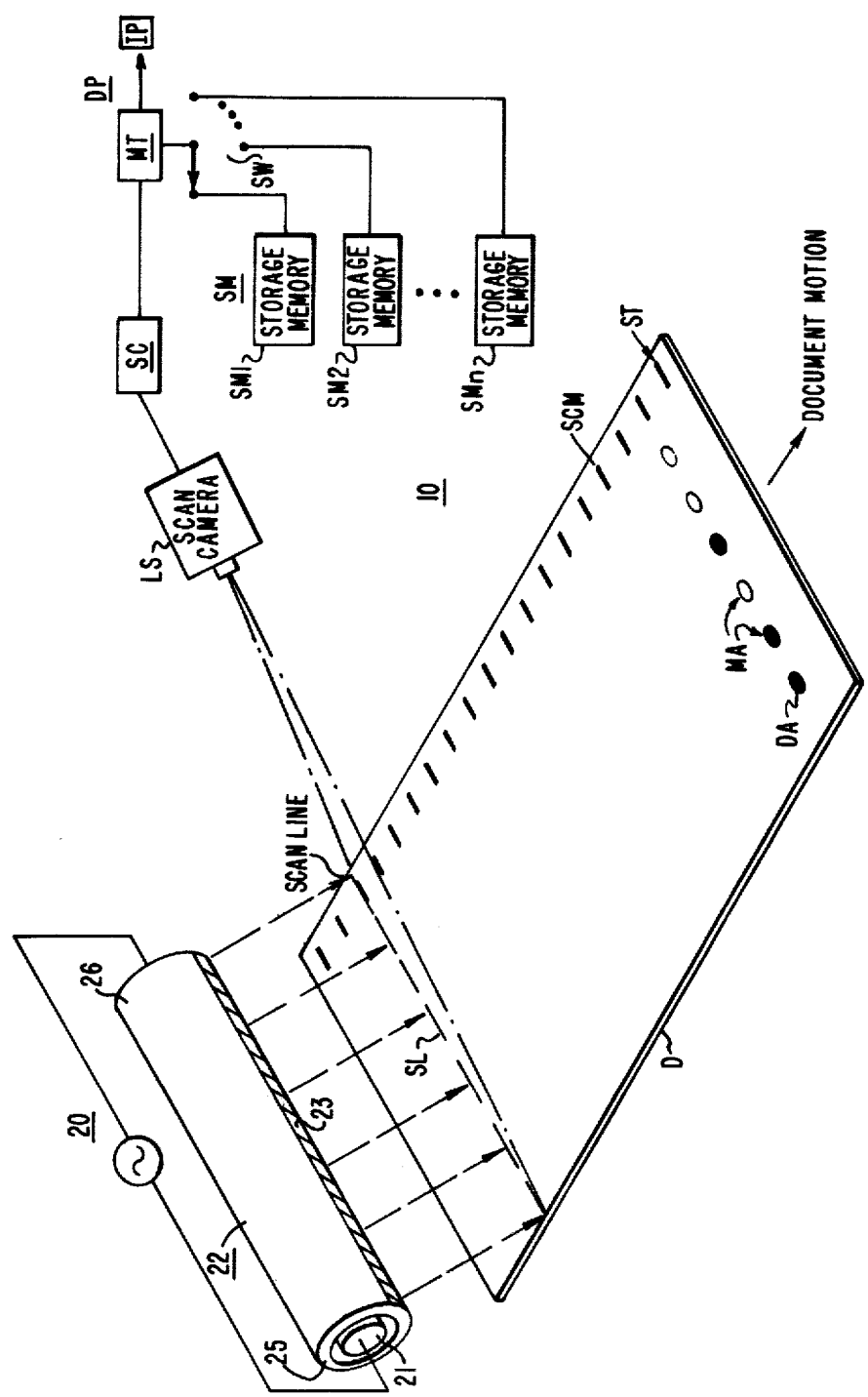
FIG. 3 is a block diagram illustration of an embodiment of the invention employing selectable programmable read-only-memories (PROM's) for determining the document format of an optical reading system.

The traditional reading head RH of FIGS. 1 and 2 is replaced in the inventive embodiment of an optical reading system 10 of FIG. 3 by a line scanning camera LS and digital processing system DP. The line scan camera LS can be suitably implemented through the use of commercially available line scan camera systems such as the Fairchild model CCD1300 which consists of a 1024 element charge-coupled device line scan camera. The 1024 element charge-coupled device module of the line scan camera forms a line scan array which senses a line of optical information corresponding to an illuminated line of the moving document D and produces an analog wave form which is proportional to the brightness of the image of the data or information present on a given line scan of the document D. The high density, i.e. 1024 elements of the line scan array of the camera 30 which corresponds to 100 or more sensing elements per scanning inch of an 8½ inch wide document, effectively represents a continuous series of pixels (picture elements) for extracting optical information. Thus each mark area MA is translated into a plurality of optical points as contrasted with the single discrete photodetecting device P of the Prior Art, thereby significantly increasing the resolution of the optical reading system 10 over that available from the Prior Art optical reading system illustrated in FIGS. 1 and 2. Thus, the use of a line scan camera as described above, eliminates the Prior Art requirement to mechanically specify a fixed location of each mark area within a document format, but rather permits a document format designer to locate the mark areas at any desired location, because the high resolution of the line scanning camera permits many pixel points to be interrogated in a given sweep across the width of a document. The motion of the document in the cross-scan direction exposes successive sweeps, or lines, of the document to the line scanning camera LS. Thus, the horizontal sweeping of the camera across the width of the document coupled with the vertical movement of the document perpendicular to the camera sweep line generates the equivalent of a raster-scanning capability such as that present in CRT displays.

Figure 5:
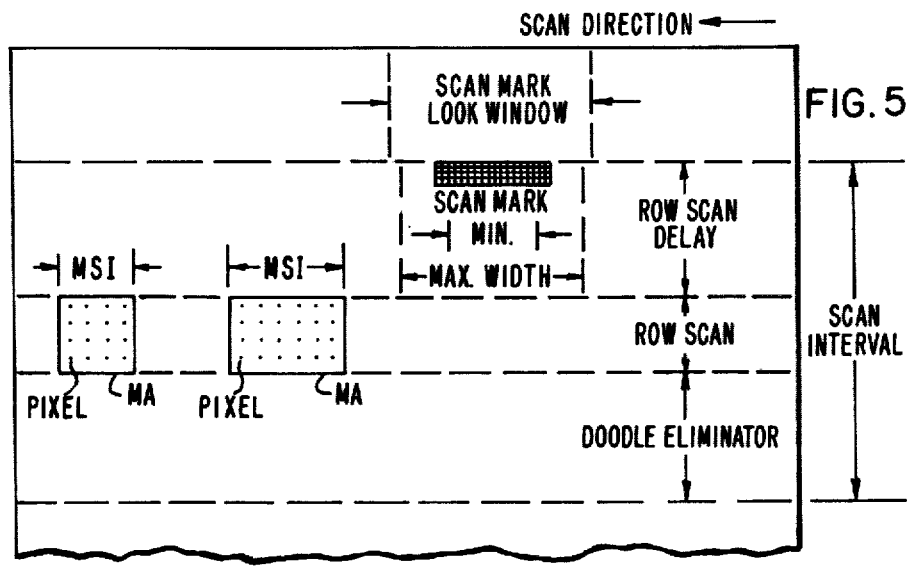
FIG. 5 is an illustration of a document format including the scan interval associated with a scan mark and mark areas of a document row.

Assuming for the purpose of discussion that the scanning direction of the camera represents the horizontal and the direction of movement of the document D represents the vertical, the line sweeping action of the line scanning camera LS in the horizontal direction will generate a plurality of optical scanning points, or pixels, and the motion of the document will expose successive vertical increments or lines of the mark areas MA of a document row of mark areas MA to additional scanning points, or pixels. Thus, as illustrated in FIG. 5, a plurality of scanning points, pixels, define a mark area as contrasted with the single photodetector "scan point" of the prior art. This significantly increases the accuracy of detecting a data mark DM in a mark area MA. Typically, the line scanning camera generates a scanning sweep at a very high speed, i.e. 5 to 10 megahertz.

The optical information derived at each pixel, or scan point, by the line scanning camera LS is transmitted as an analog signal to an analog signal processing circuit converter SC. The signal processing circuit SC functions in part to convert each analog signal representing a pixel into a two bit digital signal which establishes four levels of grey scale for each pixel. If additional grey scale resolution is required a digital signal of more than two bits can be generated.

In the application of the system 10 for grading a student's test score in terms of the presence or absence of data marks DM in the mark areas MA of the document D, a first digital level could be defined as indicative of the absence of any mark, a second digital level has an indication of a low density mark, a lightly made mark, smudge, or erasure, while a third digital level would correspond to a medium density mark and fourth digital level would indicate a high density mark corresponding to a mark area filled in heavily with a pencil. This multiple level discrimination technique is commonly employed in state-of-the-art scanners. The only parameter that varies between manufacturers is the specific number of density levels employed.

The high resolution capability associated with the multiple scanning points, or pixels, defining a given mark area MA permits a much finer level of relative mark-density resolution than is available in commercial optical reading systems. This is very important in reading documents used in student test answer sheet or election ballot processing, since the individuals will typically change their minds thus resulting in smudges and erasure. It is essential to establish a critical requirement for accurate discrimination between extraneous marks and the mark corresponding to an individual's answer or ballot selection. The digitized outputs from the analog signal processing circuit SC corresponding to the pixels are transmitted to a mark area totalizer MT which accepts and accumulates the digital levels for the predetermined mark areas MA of a document row of the document D as dictated by the stored document format of one of the storage memory devices SM1, SM2, . . . SMn of the storage memory SM, as selected by selector switch SW. The digital level information transmitted from the signal processing circuit SC which does not correspond to the mark areas MA of the selected stored document format is discarded by the mark area totalizer MT. After the digital levels of all the pixels of a given document row have been accumulated in the mark area totalizer MT, this digital information is transmitted as a 12 bit digital word to an information processor IP. In the event the document D represents a student's test answer sheet, the evaluation performed is the grading of the student's test answer sheet.

The storage memory devices SM1, SM2, ... SMn of storage memory SM can be most appropriately implemented through the use of commercially available programmable read only memories (PROMs) such as the Harris PROM 1024. Each PROM is programmed in accordance with a specific document format corresponding to a two dimensional pattern of mark areas MA and scan marks SCM. The stored format represents an "electronic mask" having "apertures" located only at the positions of mark area locations and scan mark locations of a specific document format. The capability of the system 10 for extracting information from different document formats is limited only by the number of individually programmed storage memory devices that are made selectably available to the mark area totalizer MT through the selector switch SW.

The format pattern burned into a PROM establishes the horizontal or width dimension of each mark area MA and scan mark SCM, and further defines the number of scan lines determining the vertical dimension of the mark areas MA and scan marks SCM. In addition to the stored document format each PROM includes control words to implement the program operation.

The term scan row as used hereafter corresponds to the total of all pixels, or scan points, of the two dimensional mark areas MA and scan marks SCM of a given horizontal row of the scanned document after the number of camera sweeps or scan lines as dictated by the selected storage memory device have been completed.

In a test answer sheet evaluation the mark area totalizer MT functions to "weigh" the graphite present within the respective mark areas MA of the document D corresponding to the stored document format selected by selector switch SW.

The scan line illumination of the moving document D is provided by a line light source 20. While numerous line light source systems are available for concentrating line illumination on the document D, a particurlarly suitable line light source is that described in pending application Ser. No. 900,945 filed Apr. 28, 1978, entitled "Improved Linear Light Source" which is assigned to the assignee of the present invention and incorporated herein by reference. The line light source 20 includes a commercially available elongated cylindrical incandescent lamp 21 positioned within an elongated cylindrical tubular light reflecting means 22 which produces a uniform light pattern through a light diffuser strip window 23. The light reflecting means 22 consist of a tubular glass member 25 having a light reflective coating 26 disposed on the outside surface area except for the surface area defined by the light diffuser strip window 23. The surface area of the tubular glass member 25 corresponding to the light diffuser strip window 23 is treated by a suitable process such a etching, sandblasting, etc. to produce the light diffusing characteristics of the window 23. The light reflective coating, which may be a metalized coating, concentrates the light emanating from the lamp 21 for transmission through the light diffuser window 23. A cylindrical rod lense (not shown) can be disposed between the light source 20 and the document D to further concentrate the line illumination output of the light source 20 onto the scan line SL portion of the document D which is scanned by the line scanning camera LS.

Figure 4:
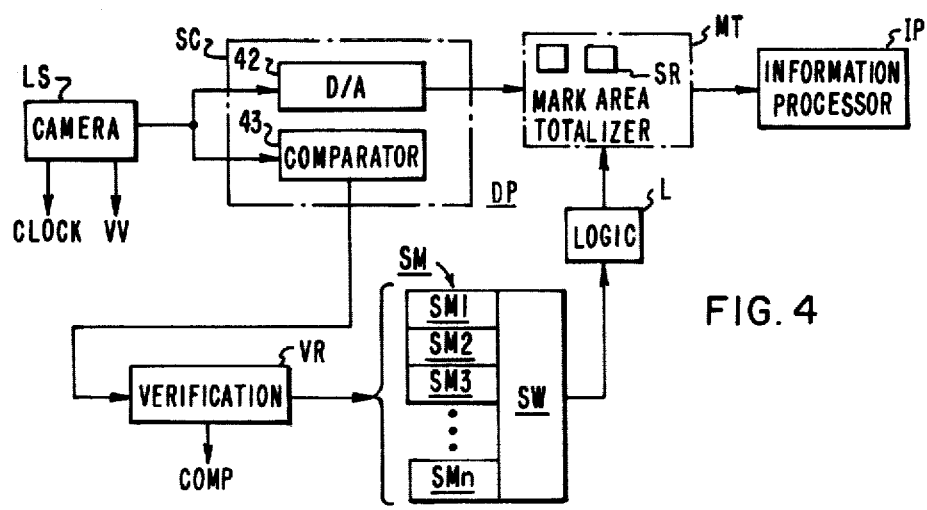
FIG. 4 is a block diagram schematic illustration of the embodiment of FIG. 3.

Referring to FIG. 4 there is schematically illustrated in block diagram a typical implementation of the signal processing circuit DP of FIG. 3. The mark area totalizer MT is illustrated for the purpose of discussion, as consisting of a plurality of storage registers or storage counters SR. The timing and synchronizing of the mark area totalizer MT and the storage memory SM which is coupled by selector switch SW through a logic control circuit L to the mark area totalizer MT is accomplished by the clock control output of the line scanning camera LS. The number of storage counters SR is no less than the maximum number of the mark areas MA of any scan row of any of the stored document formats of the storage memory devices (SM1 ... SMn).

In operation, the analog output developed by the sweep of the line scanning camera LS is converted by the signal processing circuit SC and transmitted to the mark are totalizer MT for storage in an appropriate storage counter SR. The output of a selected storage memory device indicative of a specific stored document format is synchronized with the sweep of the line scanning camera LS such that for any given scan point, or pixel, the selected stored document format directs whether the digital information corresponding to the pixel corresponds to a mark area MA of the specific document format by permitting digitial information corresponding to the mark areas to be accumulated in the mark area totalizer MT. Thus, with each successive sweep of the line scanning camera LS across the document, the digital information generated by the circuit SC corresponding to the pixels of the mark areas MA of the stored document format selected by selector switch SW are accumulated in the respective storage counters SR of the mark area totalizer MT. At the conclusion of the scanning operation of a scan row of the document D, the digital counts at the respective mark areas MA of the scan row, as stored in the mark area totalizer MT, are transmitted for processing by the information processor IP, which may typically by a general purpose or host computer.

Figure 9:
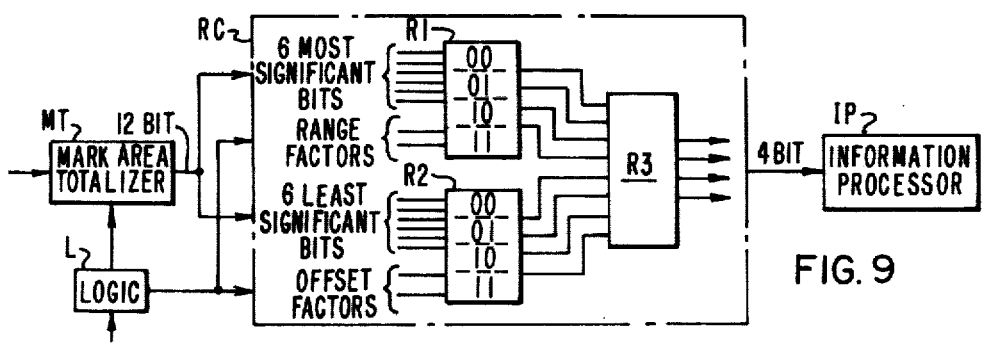
FIG. 9 is a modification to the schematic of FIG. 4 to include a data reducer between the totalizer and the information processor.

Inasmuch as the number of data points transmitted by the mark area totalizer MT to the information processor IP typically far exceeds the resolution-discrimination necessary for accurate evaluation of the mark area information on a document, a range converter RC or data reduction scheme, as illustrated in FIG. 9, can be employed to reduce the data points ultimately transmitted for processing by the information processor IP.

In the embodiment disclosed above, the definition, location, quantity and size of the mark areas MA of a document format is controlled by the stored document format of the selected storage memory device of the storage memory SM which is synchronized with the output sweep of the line scanning camera LS such that as each successive pixel readout is presented to the analog signal processing circuit SC, the corresponding clock signal of the line scanning camera LS is synchronized with the readout of the selected storage memory SM1, etc. For instance, a binary 1 readout of the selected storage memory device results in the storage of the corresponding digital information in a specific storage counter SR as determined by the logic control circuit L. If, on the other hand, the output of the selected storage memory device of storage memory SM at the particular or pixel is a binary 0 the corresponding digital information from the circuit SC is not entered for storage in the mark area totalizer MT. Thus, a binary 1 output from a selected storage memory device (SM1-SMn) defines a mark area MA of the stored document format, while a binary 0 output defines an area of the document other than a mark area MA. Another very important function of the storage memory device SM1 . . . SMn is the stored information within it which defines the locations on the stored document format corresponding to the scan marks SCM of the scan track ST which provide scan row registration and location information. The scan marks SCM function to define the location of the mark area rows of the document with respect to the scan line developed by the line scanning camera 30.

A verification circuit VR translates outputs from the analog signal processing circuit SC indicative of the presence or absence of a document. A comparator 43 in the circuit SC develops a signal indicating the presence or absence of a document under the camera LS.

Assuming the use of a programmable read only memory (PROM) to implement the devices of the storage memory SM this information as well as the mark area document format is burned into the programmable read only memory. An inexpensive PROM thus becomes the system intelligence for defining the mark areas MA and scan mark SCM of a specific document format.

Figure 6:
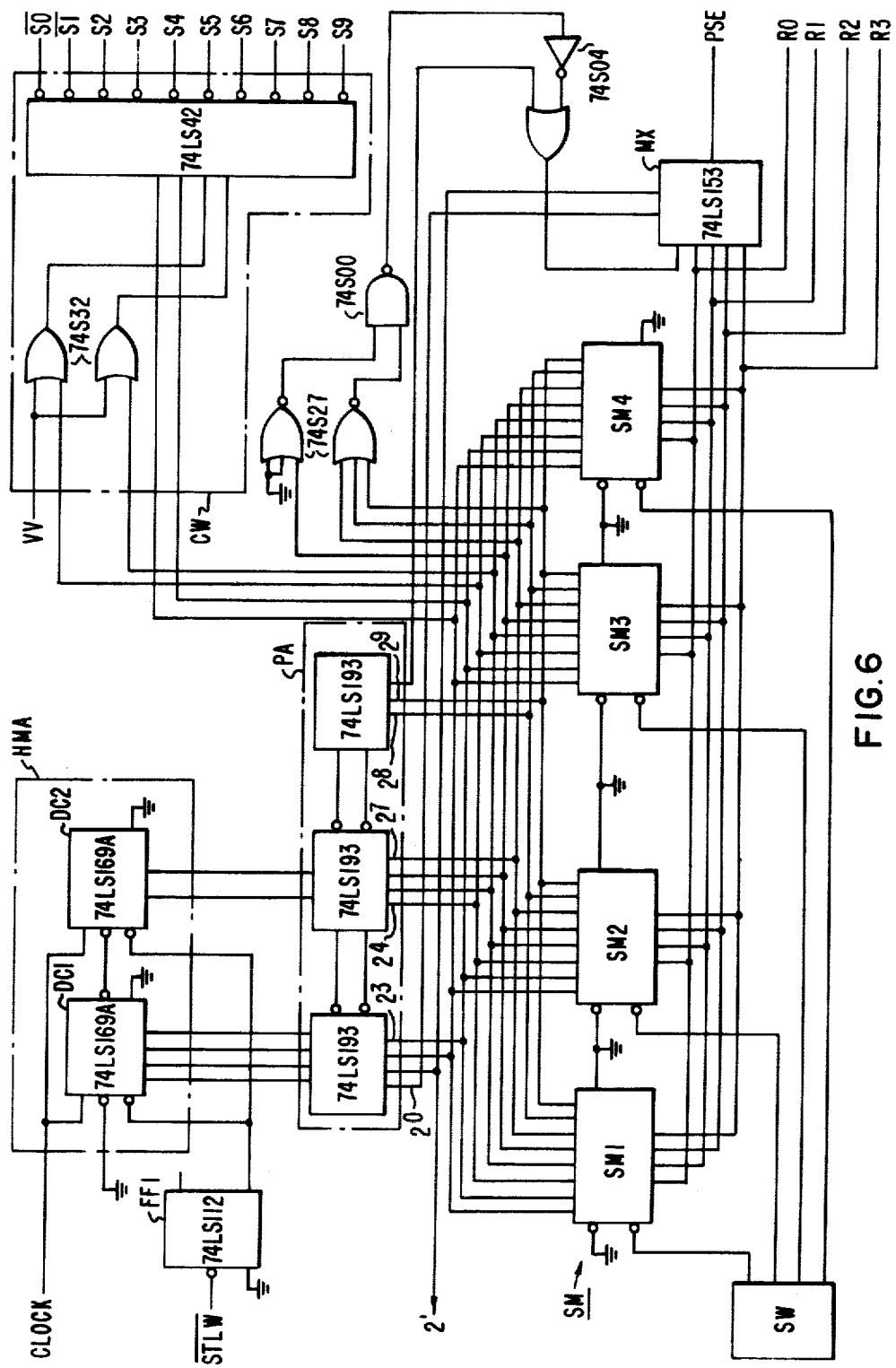
FIGS. 6, 7 and 8 are detailed schematic implementations of the embodiment of FIGS. 3 and 4.
Figure 7:
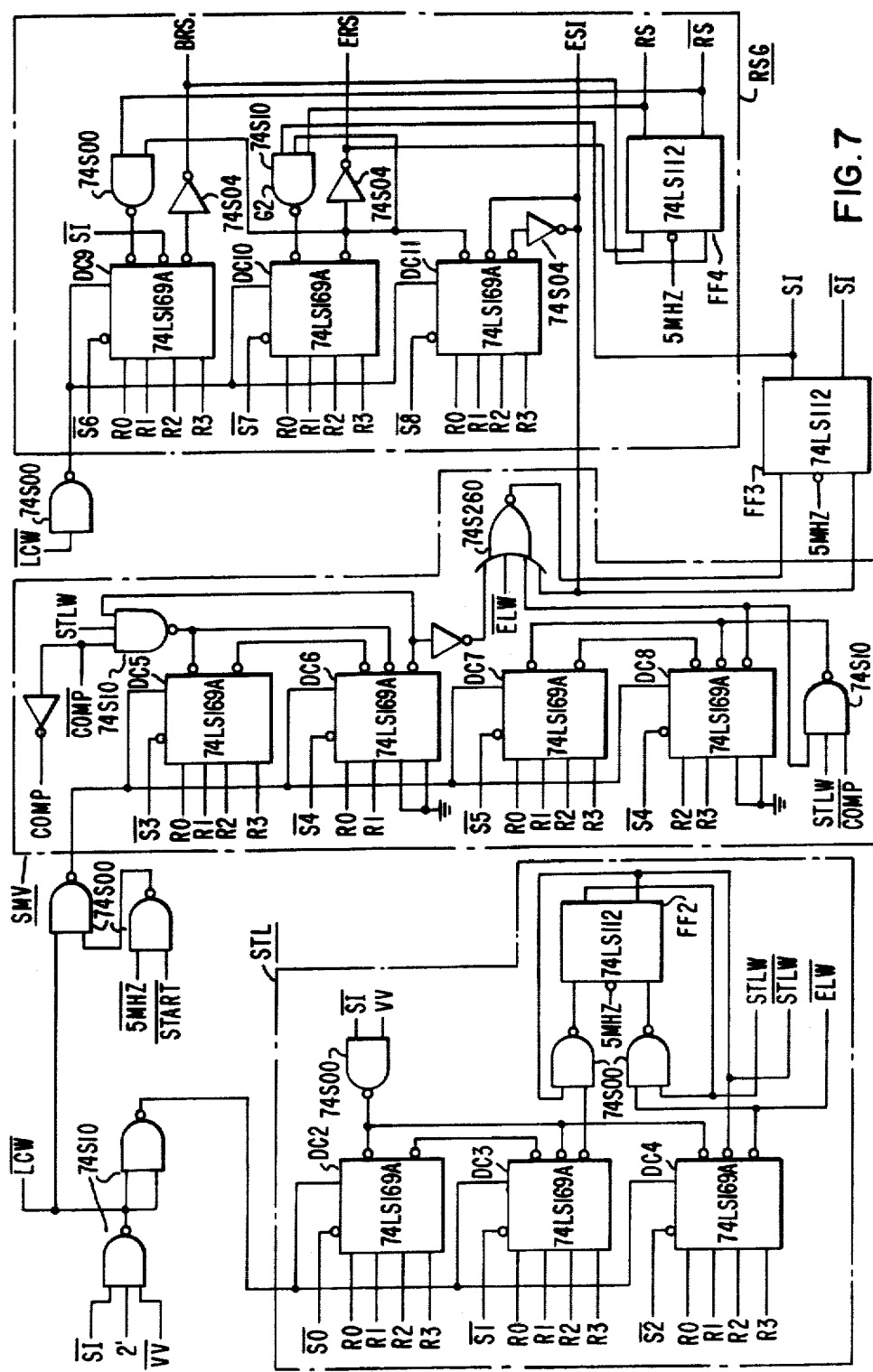
Figure 8:
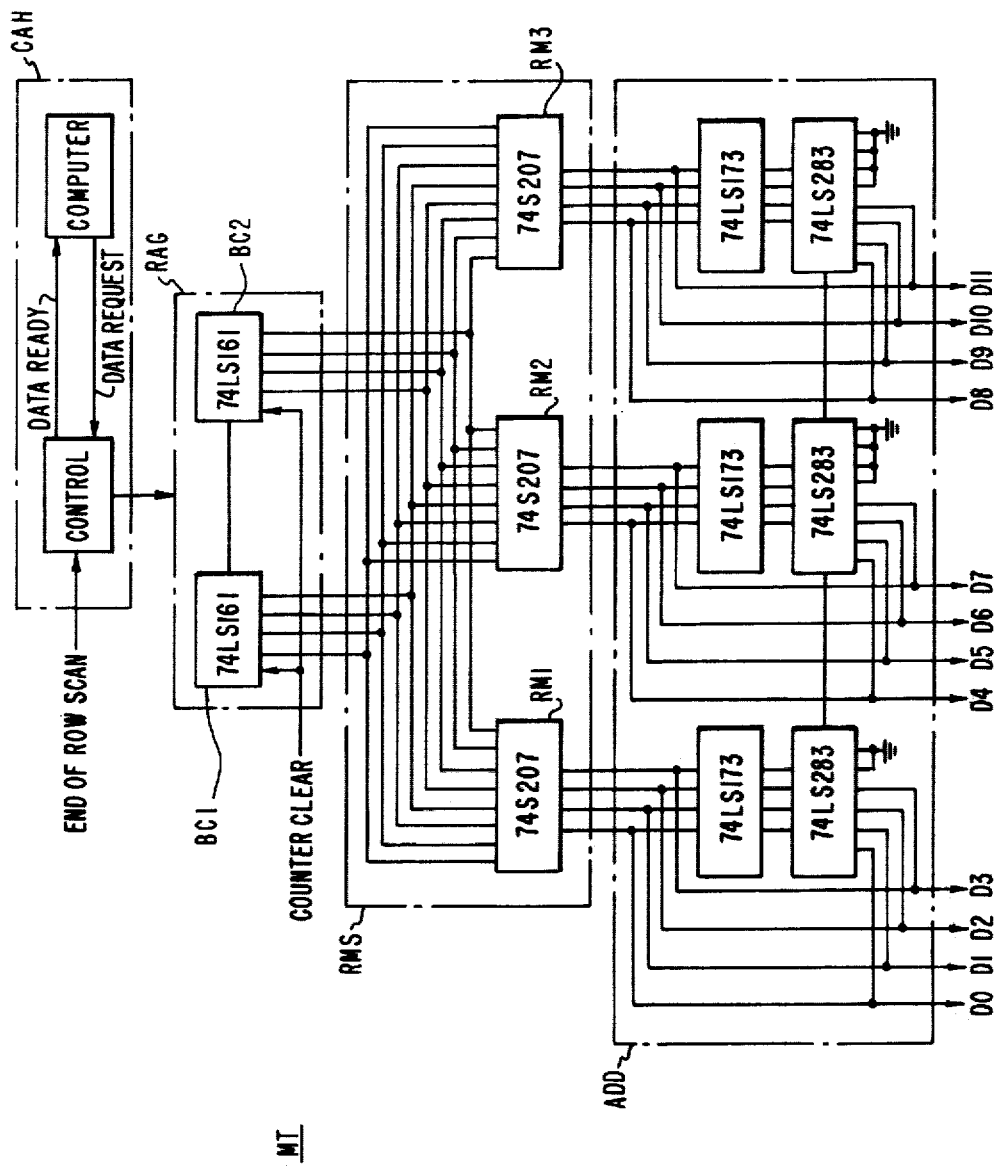

In preparation for a description of a typical detailed implementation of the signal processing system SP as schematically depicted in FIGS. 6, 7 and 8, the following terms are defined:

- Scan Mark Look Window (SMLW)—a horizontal timing signal encompassing the Scan Mark measured in terms of pictures.
- Video Valid (VV)—a logic signal developed by the Fairchild line scanning camera indicating the presence of valid video information.
- Scan Interval (SI)—a vertical timing signal, measured in terms of camera scan lines, generated in response to a Scan Mark of appropriate duration and appearing within prescribed time boundaries. The Scan Interval starts immediately on the same scan line following the detection of a valid Scan Mark. Its total duration is equal to the sum of Row Scan Delay, Row Scan Length, and Doodle Eliminator Duration.
- Row Scan Delay (RSD)—the delay in terms of scan lines corresponding to the number of lines separating the Scan Mark and the line corresponding to the leading edge of a Row Scan.
- Row Scan (RS)—the time interval expressed in a number of camera scan lines comprising the Mark Areas of a row of Mark Areas.
- Doodle Eliminator (DE)—the time interval expressed in the number of camera scan lines extending from the trailing edge of the Row Scan to the trailing edge of the Scan Interval. This time interval forms a protective region over which any erroneous mark or doodling on the document that may be associated with the genuine Scan Marks will be ignored.
- Mark Scan Interval (MSI)—is the number of pixels in a horizontal scan line of a mark area.

The nomenclature identifying each circuit component of FIGS. 6–8 is conventional JEDEC designations identifying components which are commercially available from numerous sources such as Texas Instruments.

Referring now to FIG. 6, there is schematically illustrated three PROM's SM1, SM2, SM3, and SM4 comprising the storage memory SM wherein each of the individual PROM's is selectable by the storage memory select switch SW. A PROM addressing arrangement PA provides access to three types of data stored in the respective program of read only memories of the storage memory SM. The stored data includes Scan Mark parameters, Mark Area vertical parameters, and Mark Area horizontal parameters. The Scan Mark parameters define the position and duration of the Scan Mark Look Window (SMLW) of FIG. 5 and also determine the maximum and minimum duration of the scan mark. The mark area vertical parameters determine the Row Scan Delay, the Row Scan Duration, and the Doodle Eliminator Duration of FIG. 5. The mark area horizontal parameter MSI deals with the horizontal locations and horizontal dimensions of the mark areas, defining their pattern along the scan line of the camera LS. A mark area registration signal is also provided to compensate for variations in the positioning of the document.

Each programmable read only memory of the storage memory SM is a $256 \times 4$ read only memory. The organization of the data stored in each of the programmable read only memories is such that the first sixteen address locations in each programmable read only memory contains the Scan Mark, Row Scan Delay, Row Scan, and Doodle Eliminator data which are collectively referred to as the programmable read only memory control words, while the remaining 240 address locations of each PROM contain only the data relating to the mark area pattern of a specific document format.

Relating to the stored data to the scan operation of the camera, the control word information can be related to the "fly back" or down time of the camera, while access to the mark area location information is maintained during the active time of the line scanning camera. A suitable programmable read only memory for implementing the storage memory SM is the Harris PROM 1024.

During the down time, the PROM address generator PA which consists of binary counters BC1, BC2, and BC3 is clocked through addresses corresponding to the programmable read only memory control word data. Appropriate control word loading wave forms S0-S9 are developed by the control word load signal circuit CW. During the active time of the line scan of the camera LS, the selected PROM of the storage memory SM responds to the progressive count output from the PROM address generator PA by producing four-bit data output R0, R1, R2, and R3 to define the mark areas MA of the document format of the selected PROM. The four-bit data output from the selected PROM is transmitted through the multiplex circuit MX as pixel scan enable signals PSE to the mark area totalizer MT to effect totalizing of pixel information appearing within the mark areas MA of the selected document format.

While for the purpose of discussion, it can be assumed that the horizontal positioning of a document beneath the line scanning camera LC is consistently and accurately aligned, practically speaking the horizontal position of successive documents may vary. In order to accommodate for variations in positioning of the document, the position of the mark areas MA is referenced to the leading edge of a scan mark SM. This is accomplished by detecting the true displacement and corresponding pixel count between the start of the Scan Track Look Window as determined by the signal STLW developed by the Scan Track Look Window Circuit STL of FIG. 7 and the leading edge of the scan mark SM of the specific document in question. The count obtained is the amount of correction by which the PROM address generator PA of FIG. 6 is adjusted. The Horizontal Mark Area Correction Circuit HMA of FIG. 6, which consists of down counters DC1 and DC2, provide a compensating count to the PROM address generator PA which corresponds to the time interval between the leading edge of the Scan Track Look Window and the leading edge of the scan mark SM. The binary down counters DC1 and DC2 are enabled by the J/K flip-flop circuit FF1 having as an input the Scan Track Look Window signal STLW.

The parameters describing the Scan Track Look Window of circuit STL of FIG. 7 are the absolute starting location and duration, both expressed in terms of pixels. Loading signals S0, S1 and S2, as generated by the control word load circuit CW of FIG. 6 are synchronous with the first three PROM addresses and this data is loaded and clocked into down counters DC2, DC3, and DC4 through gate G1. When a down count value of zero is reached the J/K flip-flop FF2 generates a Scan Track Look Window signal STLW.

While the generation of the Scan Track Look Window signal STLW is taking place, the scan mark SCM width is checked against predetermined maximum and minimum limits by the scan mark width validation circuit SMV. The maximum and minimum limits for the width of the scan mark SCM are expressed in a six-bit code, each located in the next three address locations of the PROM address. The maximum and minimum scan mark width data is loaded via signals S3, S4 and S5 during the down time of the line scan camera into the down counters DC5, DC6, DC7, and DC8. If the duration of the scan mark SM is within predetermined limits, a Scan Interval SI signal is generated by flip-flop circuit FF3.

The Row Scan Delay, Row Scan Length, and Doodle Eliminator duration are all expressed in terms of a fourbit code occupying PROM addresses 6, 7, and 8, respectively, measured in terms of line scans. This data is loaded into down counters DC9, DC10, and DC11 during the down time of the line scanning camera LS by the load signals S6, S7, and S8. The down counter DC9 is in a disabled state until the Scan Interval SI is generated while down counter DC10 is disabled in response to signals RS and SI applied to gate G2. The clocking of the down counter DC9 during the active time of the line scanning camera starts with the next scan line following the generation of the Scan Interval signal SI. When down counter DC9 reaches zero following a count corresponding to the Row Scan Delay, the flip-flop circuit FF4 changes state and produces a Row Scan signal RS which disables down counter DC9 and enables down counter DC10, the count content of which corresponds to the Row Scan Length. After a count of zero is reached in the down counter DC10, an output pulse C0 terminates the Row Scan RS and enables the down counter DC11 whose count content corresponds to the Doodle Eliminator duration. In a similar manner, when the count of zero is reached in the down counter DC11, an output signal End Scan Interval ESI is generated which terminates the Scan Interval SI of the flip-flop circuit FF3.

The implementation of the Mark Area totalizer MT is schematically illustrated in FIG. 8 consists of a RAM address generator RAG, a RAM storage RMS, and an adder circuit ADD.

The RAM address generator RAG consists of binary counters BC1 and BC2 which are cleared to address zero at the beginning of a Row Scan by the Beginning Row Scan signal BRS.

The totalizing process accumulates the two-bit data corresponding to the analog output of the line scanning camera produced during line by line scanning of the mark areas of the document. The line content of each mark area is stored at a distinct address in the random access memory storage RMS. As a document moves vertically, the mark area data corresponding to successive horizontal scan lines are added to the content of the previous scan line via the circuitry of the adder circuit ADD associated with the RAM elements RM1, RM2, and RM3 of the RAM storage RMS. When a Row Scan has been completed, i.e. sufficient line scans of the mark areas of a scan row to cover the complete vertical dimension of the mark area, the random access memory storage RMS contains a twelve-bit binary code at distinct address locations corresponding to the mark areas MA of the scan row of the selected document format. Each twelve-bit binary word corresponds to the sum of all of the pixel weights constituting a specific mark area. This stored information is then available for transmission to the information processor circuit 70, which, as indicated above, may consist of a host computer. A computer handshake, i.e., the process whereby the computer is alerted to the fact that the information is available and the computer in turn indicates it is ready to accept the information, can be accomplished by the computer handshake circuit CAH. The End of Row Scan signal ERS developed by the down counter DC10 of FIG. 7 is gated through logic circuit LC as a data ready signal to the information processor circuit 70. In response to a data request signal from the information processor circuit 70, the logic control circuit causes the twelve-bit words (D0-D11) corresponding to the pixel weights of the respective mark areas MA totalized in the random access memory storage RMS to be transferred to the information processor circuit 70.

The range converter circuit RC depicted schematically in FIG. 9 for reducing the 12 bit binary output word of the mark area totalizer MT to a four bit binary input to the information processor IP consists of a seriesparallel combination of four bit by 256 word read only memories R1, R2 and R3. The read only memories R1, R2 and R3 can be implemented through the use of commercially available programmable read only memory devices such as the Harris Prom 1024A.

Each of the read only memories has eight inputs. In the embodiment of FIG. 1, the six most significant bits, 6 MSB, of the 12 bit binary word developed by the mark area totalizer are supplied as inputs to six of the eight inputs of the read only memory R1. The six least significant bits 6 LSB, of the 12 bit word from the mark area totalizer MT are supplied as inputs to six of the eight inputs of the read only memory R2. The two remaining inputs of read only memory R1 accept 2 bits of range factor, or compression factor, information via the logic circuit L from the selected storage element of the storage memory SM while the 2 remaining inputs of the read only memory R2 accept 2 bits of off-set factor information from the selected storage element via the logic circuit L. The 2 bit range factor input and the 2 bit offset factor input of the read only memories R1 and R2 respectively results in 4 possible range factor input signals (00, 01, 10, and 11) and 4 separate offset factor inputs (00, 01, 10, and 11). Thus the range factor inputs and offset factor inputs of read only memories R1 and R2 can select any one of 4 separately programmed sections of the respective read only memories R1 and R2. The stored binary range factor information of the selected storage element determines which of the 4 programmed sections of the read only memory R1 will be selected for processing the six most significant bits of the 12 bit output of the mark area totalizer MT. Similarly, the offset factor information stored in the selected storage element will determine which of the 4 programmed sections of the read only memory R2 will process the six least significant bits of the 12 bit output of the mark area totalizer MT.

The range factor input to the read only memory R1 provides an upper limit range control associated with the six most significant bits. The offset factor input to the read only memory R2 provides a variable lower limit zero offset control. Thus instead of the program of read only memory R2 responding to the least significant bits from zero to some predetermined level, the offset factor input provides the capability of ignoring the lowest of the least significant bits. Thus the zero offset capability at the lower end of the 12 bit output of the mark area totalizer MT, and the upper range limit control of the 12 bit output permits processing of a preselected portion of the 12 bit binary output word of the mark area totalizer MT.

This compression technique provides a basis for ignoring mark area count values which are less than that anticipated from a true data mark and employing the full resolution on mark area count values which correspond to a data mark.

Thus the read only memories R1 and R2 take the totalized output of the mark area totalizer MT and range this output such that the darkest anticipated data mark corresponds to the full scale range of the read only memory R3.

The 4 bit output of the read only memories R1 and R2 serve as the 8 inputs to the read only memory R3 which converts the 8 bit input into a 4 bit output in accordance with the programming of the read only memory R3. The 4 bit outputs of the read only memory R3 serves as the input to the information processor IP. The read only memories R1, R2 and R3 can be programmed in accordance with any one of several known compression function techniques, i.e., logarithmic, parabolic, linear, etc.

We claim:

1. An optical reader apparatus for the line-by-line reading of information from a document, comprising:
   a line scan video camera means including a line array of a plurality of photosensitive elements for scanning successive lines of document and developing an analog video output signal corresponding to the document information present on each scan line, said analog video output signal of each scan line consisting of a plurality of signal elements, each corresponding to a scan point of the document corresponding to one of said photosensitive elements,
   analog-to-digital converter means connected to said line scan video camera to convert the analog video output signal into a digital signal comprised of signal elements corresponding to the plurality of scan points of the scan line,
   a plurality of selectable document formats, each defining a specific pattern of document mark areas or locations of interest,
   means for selecting one of said plurality of selectable document formats, and
   digital information processing means including a mark area totalizer means operatively connected to said analog-to-digital converter means and responsive to a selected document format for totalizing the signal elements of said digital signal corresponding to scan points within the respective mark areas or locations defined by the selected document format.

2. An optical scanning apparatus as claimed in claim 1 including a storage memory means, said plurality of selectable document formats being stored in said storage memory means, said selector means including means for selectively addressing the stored selectable document formats.

3. An optical scanning apparatus as claimed in claim 1 including a plurality of programmable read only memories, each of said selectable document formats being stored in a programmable read only memory.

4. An optical scanning apparatus as claimed in claim 1 wherein said digital information processing means further includes means for evaluating the digital signal information of the respective mark areas or locations totalized by said mark area totalizer means, said means for evaluating being operatively connected to said mark area totalizer means, said mark area totalizer means developing a multi-bit digital output signal indicative of the totalized digital information of the respective mark areas of each row of mark areas of the selected document format .

5. An optical reader system for the line-by-line reading of information from a document, such as a student answer sheet or an election ballot, where an individual's selections are entered as marks, i.e., graphite pencil marks, within defined mark areas of the document in accordance with the individual's selections, the document format including a predetermined pattern of mark areas and preprinted scan marks for system timing, comprising:
   a line scan video camera means for scanning successive lines of a document and developing an analog video output signal corresponding to the presence or absence of marks,
   analog-to-digital converter means connected to said line scan video camera means to convert the analog video output signal into a digital signal,
   a plurality of selectable document formats, each defining a specific pattern of mark areas and scan marks,
   selector means for selecting one of said plurality of selectable document formats, and
   digital information processing means operatively connected to said selectable document formats and said analog-to-digital converter means, and responding to the selected document format by processing those portions of the digital signal corresponding to the pattern of mark areas and scan marks defined by the selected document format, the analog signal developed by said line scan video camera means for each line scan of a mark area consisting of a plurality of picture elements, or discrete scan points, said digital information processing means including a digital totalizing means for totalizing the digital information of the digital signal from the analog converter means which corresponds to the respective mark areas of a selected document format, said digital totalizing means developing a multi-bit digital output signal indicative of the presence or absence of marks within the mark area pattern of the selected document format.

6. An optical reading apparatus as claimed in claim 5 further including means connected to said digital totalizing means for discriminating between mark area digital information indicative of a valid mark and that of an erroneous mark.

7. An optical reader system for the line-by-line reading of information from a document, such as a student answer sheet or an election ballot, where an individual's selections are entered as marks, i.e., graphite pencil marks, within defined mark areas of the document in accordance with the individual's selections, the document format including a predetermined pattern of mark areas and preprinted scan marks for system timing, comprising:

- a light source for illuminating line portions of a document,
- a line scan video camera means for scanning successive lines of a document illuminated by said light source and developing an analog video output signal corresponding to the presence or absence of marks,
- analog-to-digital converter means connected to said line scan video camera means to convert the analog video output signal into a digital signal,
- a memory storage means containing a plurality of selectable document formats, each defining a specific pattern of mark areas and scan marks,
- selector means for selecting one of said selectable documents formats, and
- digital information processing means operatively connected to said selectable document formats and said analog-to-digital converter means, and responding to the selected document format by processing those portions of the digital signal corresponding to the pattern of mark areas and scan marks defined by the selected document format, the analog signal developed by said line scan video camera means for each line scan of a mark area consisting of a plurality of picture elements, or discrete scan points, said digital information processing means including a digital totalizing means for totalizing the digital information of the digital signal from the analog converter means which corresponds to the respective mark areas of a selected document format, said digital totalizing means developing a multi-bit digital output signal indicative of the presence or absence of marks within the mark area pattern of the selected document format.

8. An optical reader system as claimed in claim 7 wherein said memory storage means consists of a plurality of programmable read only memory means, each storing a predetermined document format.

9. An optical reader apparatus for the line-by-line reading of information from a document, comprising:

- a line scan video camera means including a line array of a plurality of photosensitive elements for scanning successive lines of a document and developing an analog video output signal corresponding to the document information present on each scan line, said analog video output signal consisting of a plurality of analog signal elements representing document information at discrete scan points of the document corresponding to the respective photosensitive elements,
- analog-to-digital converter means connected to said line scan video camera means to convert to analog video output signal into a digital signal, said digital consisting of digital signal elements corresponding to said scan points,
- means for generating an electronic mask defining a specific pattern of document mark areas or locations of interest, and
- digital information processing means including a mark area totalizer means connected to said analog-to-digital converter means and responsive to said electronic mask by totalizing the digital signal elements of the scan points present within the respective mark areas defined by said electronic mask and developing a multi-bit digital output signal indicative of the information within said mark areas, said digital information processing means further including means for analyzing said multi-bit digital output signal to evaluate the information present on said document.

10. An optical scanning apparatus as claimed in claim 9 wherein said means for generating an electronic mask is a programmable storage means.

11. An optical reader system for the line-by-line reading of information from a document, such as a student answer sheet or an election ballot, where an individual's selections are entered as marks, i.e., graphite pencil marks, within defined mark areas of the document in accordance with the individual's selections, the document format including a predetermined pattern of mark areas and preprinted scan marks for system timing, comprising:

- a line scan video camera means for scanning successive lines of a document and developing an analog video output signal corresponding to the presence or absence of marks,
- analog-to-digital converter means connected to said line scan video camera means to convert the analog video output signal into a digital signal,
- a programmable storage means including a stored document format defining a specific pattern of mark areas and scan marks, and
- digital information processing means operatively connected to said programmable storage means and said analog-to-digital converter means, and responding to the stored document format by processing those portions of the digital signal corresponding to the pattern of mark areas and scan marks defined by the stored document format, the analog signal developed by said line scan video camera means for each line scan of a mark area consisting of a plurality of picture elements, or discrete scan points, said digital information processing means including a digital totalizing means for totalizing the digital information of the digital signal from the analog converter means which corresponds to the respective mark areas of the stored document format, said digital totalizing means developing a multi-bit digital output signal indicative of the presence or absence of marks within the mark area pattern of the stored document format.

12. An optical reader apparatus as claimed in claim 11 wherein said stored document format corresponds to a document format comprised of vertically spaced apart horizontal rows of document areas, said stored document format generating a row scan interval defining the number of successive scan lines corresponding to a horizontal row of document areas, and generating a doodle eliminator time interval defining the number of successive scan lines following a row scan interval during which time the digital information processing means ignores the digital signals from the analog-to-digital converter means.

* * * * *